Figure 1:
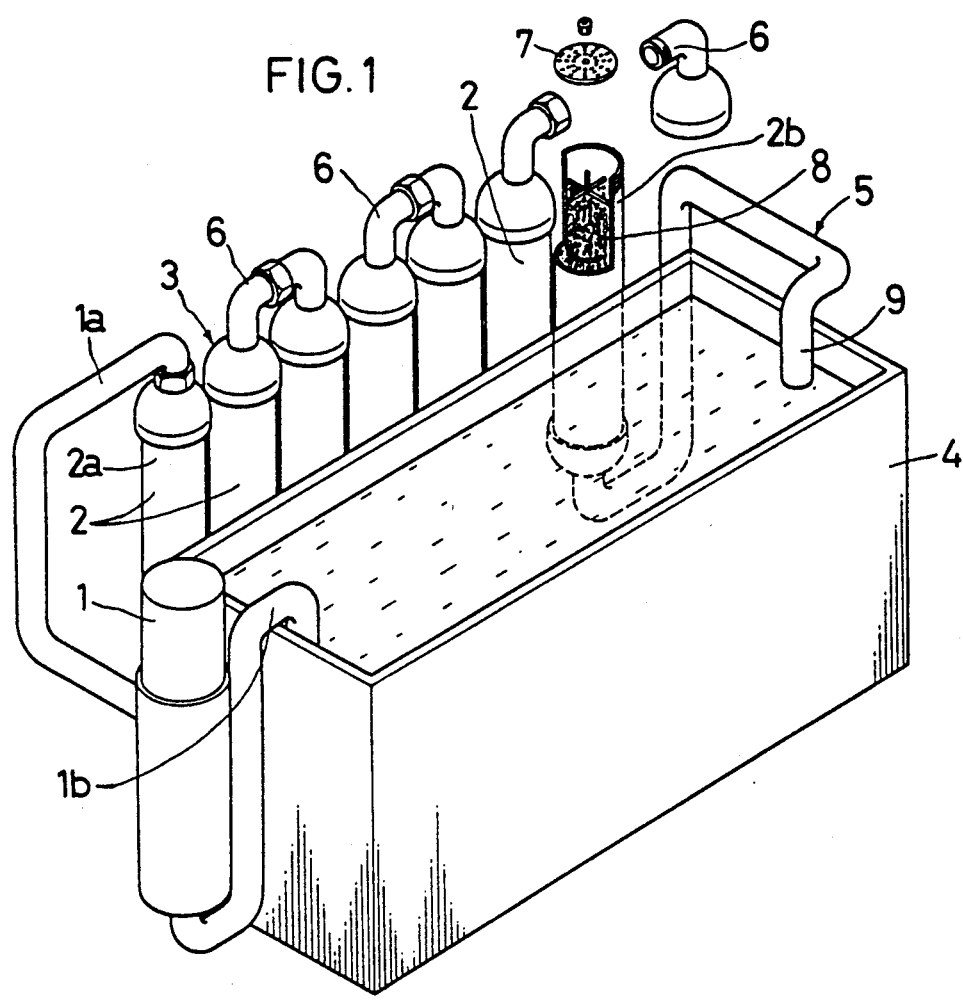

United States Patent [19]

Hatanaka et al.

[11] Patent Number: 5,034,138
[45] Date of Patent: Jul. 23, 1991

[54] METHOD AND APPARATUS FOR PRODUCING ACTIVATED MINERAL WATER

[75] Inventors: Kenji Hatanaka; Kanji Nakatani, both of Wakayama, Japan

[73] Assignee: Shinki Sangyo Co., Ltd., Wakayama, Japan

[21] Appl. No.: 634,775

[22] Filed: Dec. 27, 1990

Related U.S. Application Data

[63] Continuation of Ser. No. 474,458, Feb. 2, 1990, abandoned.

[30] Foreign Application Priority Data

Sep. 18, 1989 [JP] Japan .................. 1-243031

[51] Int. Cl.⁵ ............................................. C02F 1/68
[52] U.S. Cl. ................................. 210/749; 210/764; 210/766; 210/222; 210/263; 210/765
[58] Field of Search ............... 210/749, 765, 721, 222, 210/625, 150, 151, 702, 764, 766, 263, 716

[56] References Cited

U.S. PATENT DOCUMENTS

| | | | |
|---|---|---|---|
| 2,171,203 | 8/1939 | Urbain et al. | 210/721 |
| 2,447,511 | 8/1948 | Leaf | 210/721 |
| 3,890,691 | 6/1975 | Montagne | 128/66 |
| 3,948,252 | 4/1976 | Montagne | 128/66 |
| 3,956,132 | 5/1976 | Takemitsu | 210/748 |
| 4,000,066 | 12/1976 | Squires | 210/678 |
| 4,007,118 | 2/1977 | Ciambrone | 210/150 |
| 4,053,402 | 10/1977 | Bachhofer et al. | 210/752 |
| 4,115,267 | 9/1978 | Bachhofer et al. | 210/136 |
| 4,148,731 | 2/1979 | Brigante | 210/223 |
| 4,247,398 | 1/1981 | Mohri | 210/222 |
| 4,249,994 | 2/1981 | Dolle | 210/222 |
| 4,255,257 | 3/1981 | Greiner et al. | 210/721 |
| 4,366,065 | 12/1982 | Leslie et al. | 210/695 |
| 4,495,074 | 1/1985 | Hagiwara et al. | 210/695 |
| 4,530,120 | 7/1985 | Etani | 210/765 |
| 4,707,263 | 11/1987 | Nishimori et al. | 210/282 |
| 4,787,973 | 11/1988 | Ando et al. | 210/282 |
| 4,880,547 | 11/1989 | Etani | 210/728 |

Primary Examiner—Stanley S. Silverman
Assistant Examiner—Cynthia L. Nessler
Attorney, Agent, or Firm—Wenderoth, Lind & Ponack

[57] ABSTRACT

A method and apparatus for producing activated mineral water. Material water is pressurized by a pump and passed through a plurality of columns connected in series and filled with inorganic substances, so that the pressurized water is brought into contact with the inorganic substances while passing through the pipes. The water discharged from the pipes is aerated. The above-mentioned cycle may be repeated a plurality of times.

9 Claims, 1 Drawing Sheet

METHOD AND APPARATUS FOR PRODUCING ACTIVATED MINERAL WATER

This application is a continuation of now abandoned application, U.S. Ser. No. 07/474,458 filed on Feb. 2, 1990.

The present invention relates to a method and apparatus for producing activated mineral water which is hygienically clean and which is suitable as water for daily use and for use in food processing.

As one prior art water purification method, it is known to pass water under atmospheric pressure through a tank which is filled with filter such as activated carbon and fine- or coarse-grained natural stone.

One problem with such a method or apparatus used for this method is that germs tend to increase in the apparatus if water is filtered at normal temperatures and under normal pressures. Another problem is that it is difficult to efficiently produce mineral water containing effective inorganic substances.

It is an object of present invention to provide a method and apparatus for producing activated mineral water which is capable of efficiently producing mineral water containing a sufficient amount of minerals and other inorganic substances and capable of restraining the proliferation of germs.

It is not clear how the inorganic substances act on the pressurized water being fed. But it is clear that the higher the water pressure, the higher its temperature rises. The inorganic substances are dissolved in a suitable amount in the warm water. The aeration step serves to increase its air content. The water temperature as well as its air content can be progressively increased by repeatedly feeding water under pressure and aerating it.

According to the present invention, activated mineral water capable of restraining the proliferation of germs can be produced efficiently. Thus the method and apparatus according to the present invention can be used e.g. to prevent the proliferation of bacteria such as colon bacilli and plankton in relatively low-temperature water in a bathtub of a medical spa.

Figure 2:
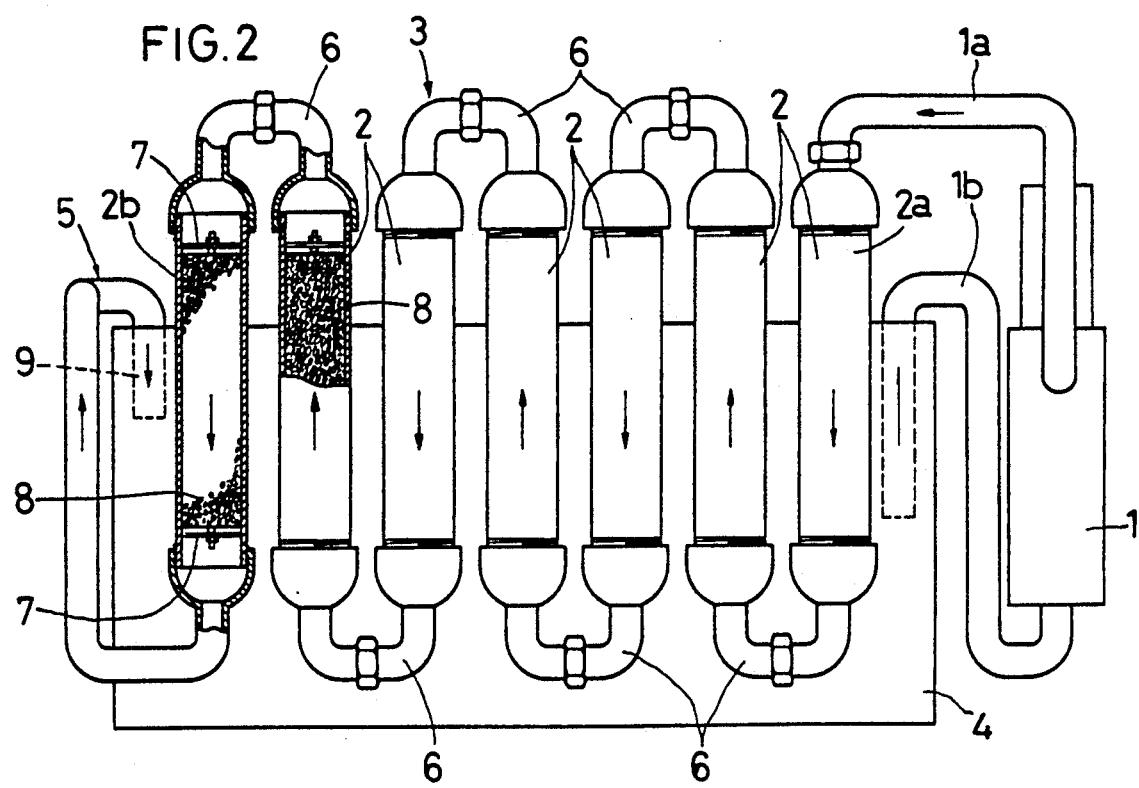

Other features and objects of the present invention will become apparent from the following description taken with reference to the accompanying drawings, in which:

FIG. 1 is a partially cutaway and partially exploded perspective view of the apparatus for producing activated mineral water embodying the present invention; and FIG. 2 is a partial sectional exploded rear view of the same.

The material water used in the present invention may be tap water, well water, spring water, underground water or river water. If the material water is not hygienically clean, it has to be purified beforehand by means of a separate filter.

The inorganic substances used in the present invention may be minerals, ceramics and iron slugs and should be selected from the materials capable of mineralizing water effectively. A suitable amount of herb medicines and bone china and powdered germanium may be added to the inorganic substances. It is known that an addition of 0.5 gram of germanium per 100 liters of material water increases the temperature of the resulting activated mineral water by 5°-10° C. Helical chips produced by machining operations should be used as the iron pieces because they can effectively mineralize water. As the minerals, ferromagnetic minerals such as basalt, andesite and magnetite having natural residual magnetism and containing some amounts of iron or magnesium are preferable.

The pressure of pressurized water is not limited to a specific range but should be 5-15 atm, preferably about 10 atm.

As shown in FIG. 1, the device for producing mineral water according to the present invention comprises a pump 1 for pressurizing the material water, a water permeation unit 3 having a plurality of columns 2 filled with the above-described inorganic substances through which the pressurized water passes, and an aerator 5 for returning the pressurized water from the water permeation unit 3 into a water tank 4 to aerate it. In the preferred embodiment, the water permeation unit has seven columns 2 connected together in series by means of U-shaped connecting pipes 6. A pair of stainless porous plates 7 are provided in each column 2 in vertically opposed relation to each other. Inorganic substances 8 composed mainly of granular basalt are packed therebetween.

The material water pressurized to 5-15 atm. is fed from the tank 4 into the column 2a at one end of the water permeation unit 3 through the pressure pump 1 and pipes 1a and 1b. The column 2a at the other end thereof is connected to the aerator 5 so that the pressurized water will be aerated when discharged from a water discharge pipe 9 located higher than the level of water in the tank 4.

While the material water is circulated through the seven columns 2 a plurality of times, the inorganic materials will be gradually dissolved in the water and the water temperature will rise. Also the oxygen content will increase gradually by aeration. Thus the material water will turn into activated mineral water. To produce magnetized and activated mineral water, magnetic substances such as ferromagnetic minerals are used as the inorganic substances 8.

Experiment

Table 1 shows the compositions of the basalt and the ceramics among the inorganic substances for use in the method and apparatus according to the present invention. The following experiment was conducted in order to examine the relationship between the composition of the activated mineral water obtained by use of the above-mentioned inorganic substances and the pressure fed to the material water.

3.6 kg of basalt crushed into 5-by-5 mm pieces and ceramics balls each weighing 6 grams were packed in each of the respective seven columns (9 cm in diameter and 30 cm in length) in the same amounts. The apparatus was operated continuously for 24 hours with the discharge pressure (gauge pressure) of the pressure pump set to 9.25 kg/cm$^2$. About 100 liters of activated mineral water was obtained from 100 liters of material water. Table 2 shows the results of the quality examination of the activated mineral water thus obtained.

Table 2 also shows the results of quality examination of the material water (comparative example 1) and water obtained by circulating the material water with the discharge pressure kept at the lowest level (comparative example 2).

Tables 1 and 2 show that the calcium and magnesium contained in the inorganic substances dissolve into the mineral water in considerable amounts and the oxygen content as well as the water temperature increase to sufficient levels if the feed pressure of water is at 10 atm.

In order to see how effectively the above-described activated mineral water can stave off germs, a small amount of the water was stored in a closed vessel made of synthetic resin at 8° C. Table 3 shows the number of germs in the water samples measured periodically.

No germs were recognized by the naked eye in the activated mineral water obtained according to the present invention even after it had been stored for two years.

TABLE 1

| Sample | Item (% by weight) | | | | | | |
|---|---|---|---|---|---|---|---|
| | SiO$_2$ | Al$_2$O$_3$ | K$_2$O | CaO | Fe$_2$O$_3$ | Na$_2$O | MgO |
| Basalt | 65 | 16 | 1.1 | 4.3 | 6.3 | 3.2 | 4.1 |
| Ceramic | 76 | 16 | 2.9 | 0.9 | 0.9 | 0.5 | 0.1 |

TABLE 2

| Item | (unit: mg/l unless specifically indicated) Number | | |
|---|---|---|---|
| | Mineral water (10 atm.) | Comparative example 1 (source water) | Comparative example 2 (circulation) |
| Nitrogens nitrite and nitrate | 4.5 | 0.89 | 0.88 |
| Chlorine ion | 43 | 12 | 36 |
| Organic materials (KMnO$_4$ consumption) | 10 | 1.8 | 4.2 |
| Dissolved oxygen (mg O/l) | 5.3 | 4.2 | — |
| Water temperature (°C.) | 70 | 32 | 32 |
| Iron | less than 0.05 | less than 0.05 | less than 0.05 |
| Manganese | less than 0.01 | less than 0.01 | less than 0.01 |
| Zinc | less than 0.005 | less than 0.005 | 0.55 |
| Lead | less than 0.01 | less than 0.01 | less than 0.01 |
| Fluorine | less than 0.27 | less than 0.15 | less than 0.15 |
| Calcium.Magnesium etc. | 120 | 51 | 68 |
| Evaporite | 370 | 96 | 170 |
| pH value | 8.6 | 7.4 | 7.3 |
| Chromaticity | 1 | less than 1 | less than 1 |
| Turbidity | less than 1 | less than 1 | less than 1 |

TABLE 3

| Microbe | Elapsed time (piece/ml) | | |
|---|---|---|---|
| | Immediately after production | Two weeks after production | Four weeks after production |
| Number of living microbes | 0 | 0 | 0 |
| Mould.Yeast | 0 | 0 | 0 |

What is claimed is:

1. A method for producing mineral water comprising the steps of pressuring water under a pressure of 5–15 atm., passing said pressurized water through a material comprising crushed basalt so that inorganic substances in said material are dissolved into said pressurized water, and subjecting said pressurized water to aeration.

2. A method according to claim 1, wherein said pressure is about 10 atm.

3. A method according to claim 1, wherein said inorganic substances comprise metallic substances.

4. A method according to claim 1, wherein said material further comprises germanium.

5. A method according to claim 1, wherein said material further comprises bone china.

6. A method according to claim 1, wherein said material further comprises an herb medicine.

7. A method according to claim 1, wherein said material further comprises andesite.

8. A method according to claim 1, wherein said material further comprises magnetite.

9. A method according to claim 1, wherein said material further comprises a ceramic.

* * * * *